United States Patent [19]

Ford, Jr.

[11] 4,414,181

[45] Nov. 8, 1983

[54] GAS GENERATOR OUTLET HAVING CONTROLLED TEMPERATURE TRANSITION

[75] Inventor: Edward J. Ford, Jr., Cupertino, Calif.

[73] Assignee: The United States of America as represented by the Secretary of the Navy, Washington, D.C.

[21] Appl. No.: 317,712

[22] Filed: Nov. 2, 1981

[51] Int. Cl.³ .............................................. B01J 19/02
[52] U.S. Cl. .................................... 422/240; 60/909; 138/149; 285/47; 285/55; 422/241
[58] Field of Search ....................... 422/240, 241, 310; 138/149; 60/200 A; 285/47, 55

[56] References Cited

U.S. PATENT DOCUMENTS

| | | | |
|---|---|---|---|
| 2,962,051 | 11/1960 | Burkes, Jr. | 138/149 |
| 3,048,972 | 8/1962 | Barlow | 239/265.13 |
| 3,124,542 | 3/1964 | Kohn | 60/200 A X |
| 3,170,289 | 2/1965 | Kramer | 138/149 |
| 3,248,874 | 5/1966 | Grina | 138/149 |
| 3,313,488 | 4/1967 | Lovingham | 239/127.1 |
| 3,367,817 | 2/1968 | Bluck | 60/200 A X |
| 3,608,312 | 9/1971 | Miltenberger | 60/204 |
| 3,870,346 | 3/1975 | Kappeler et al. | 285/47 |
| 4,117,201 | 9/1978 | Keifert | 422/241 X |

*Primary Examiner*—Richard L. Chiesa
*Attorney, Agent, or Firm*—R. F. Beers; Charles D. B. Curry; George L. Craig

[57] ABSTRACT

A gas generator outlet manufactured of different metals, each possessing different thermal capability, welded together with a tapered internal insulation system. The generator outlet is designed to contain a high-pressure gas having a flame temperature of 3000° F. The external surface of the gas generator outlet remains at or below 600° F. while the outlet interfaces with a metal manifold having a temperature of approximately 3000° F.

2 Claims, 2 Drawing Figures

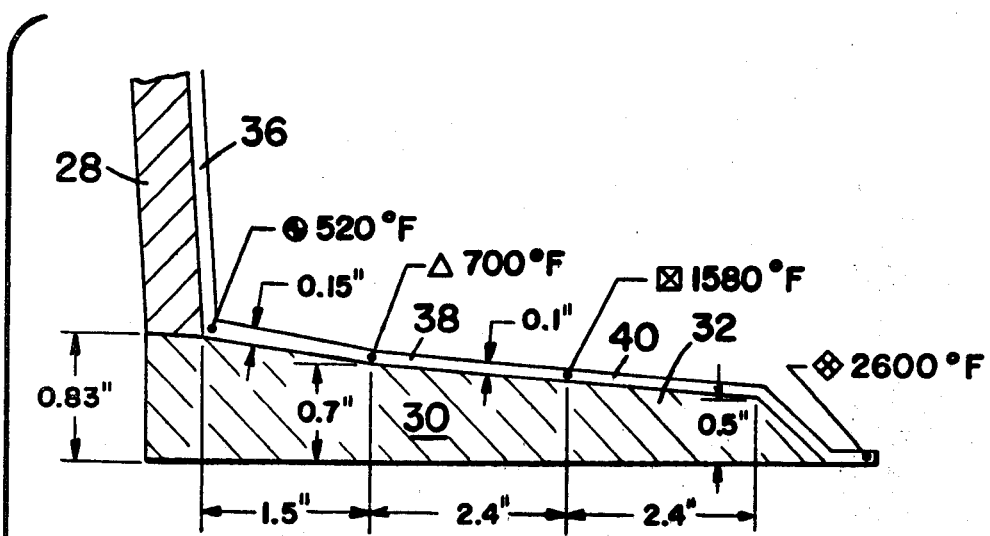
FIG_2
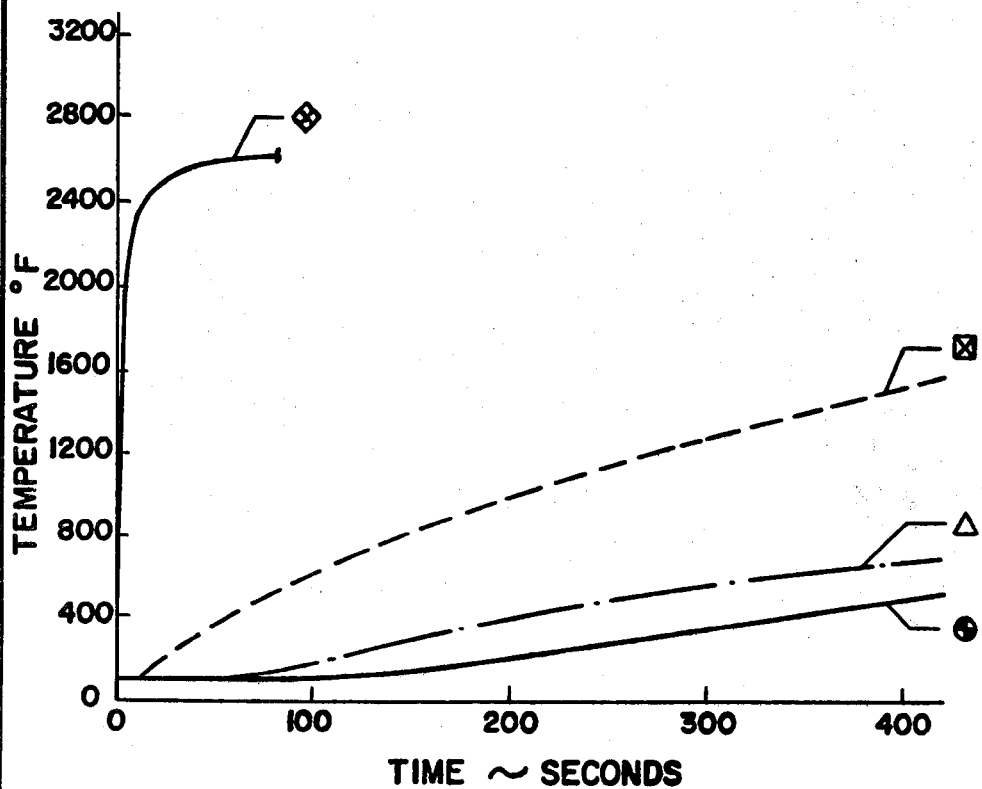

GAS GENERATOR OUTLET HAVING CONTROLLED TEMPERATURE TRANSITION

BACKGROUND OF THE INVENTION

1. Field of the Invention

The invention relates to gas generator outlets and more particularly to an outlet for conducting gas from a generator required to have an external temperature of 600° F. to a manifold in which the gas temperature may reach 3000° F.

2. Description of Prior Art

In rocket, missile and missile guidance platform applications generation of extremely high temperature gases for propulsion and guidance is regularly employed. Modern high impulse propellants generate gases having such high combustion temperatures and pressures that heat degradation and erosion of materials and structures exposed to the gases may cause severe damage. Conventional applications involve directing the gases from the gas generator through an exhaust nozzle into the atmosphere or a vacuum and are thus primarily concerned with the effects of heat erosion on the throat and wall area of the nozzle. The general solution is to line the throat and wall areas with a coolant and/or ablative material to minimize heat degradation during the burn phase of the gases. In the present invention, space and weight are at a premium. The gases must be channeled from the gas generator into a metal manifold over a very short distance and a precise, predetermined temperature gradient between the two must be established and maintained to prevent damage to the gas generator and other equipment. Poured thermoplastic resins as used in prior art cannot be used to provide the very precise temperature gradient over the short space involved. Thus the instant invention involves a multiple-piece interlocking tubular liner ensheathed by a multiple-piece interlocking tapered ablative insulator which is itself encased by a multiple-piece welded metal sleeve of several alloys having varying heat transfer properties.

SUMMARY OF THE INVENTION

A gas generator outlet consisting of a tapered metal tubing enclosing a tapered silica phenolic insulator which encases a molybdenum alloy tubular liner. The outlet provides an external surface temperature transition from 600° F. at the gas generator case weld joint outlet to 3000° F. at the metal manifold into which the gas is directed. The outer layer of tapered metal tubing utilizes several metals having increasing thermal capability in traversing from the generator case to the manifold.

The primary object of invention is to provide a minimum weight and size gas generator outlet capable of transferring a gas from a gas generator to a metal manifold while maintaining an external surface temperature gradient of 600° F. at the gas generator to 3000° F. at the manifold.

Another object of invention is to provide a multiple layer tubular structure capable of transporting very hot gases in which the heat transfer capability along both the radial and longitudinal axis of the tube varies in a precise, predetermined manner.

Other objects, advantages and novel features of the present invention will become apparent from the following description and associated drawings.

BRIEF DESCRIPTION OF THE DRAWINGS

FIG. 2 is a chart illustrating the temperature response as a function of time for one embodiment of the invention.

DESCRIPTION OF THE PREFERRED EMBODIMENT

Figure 1:
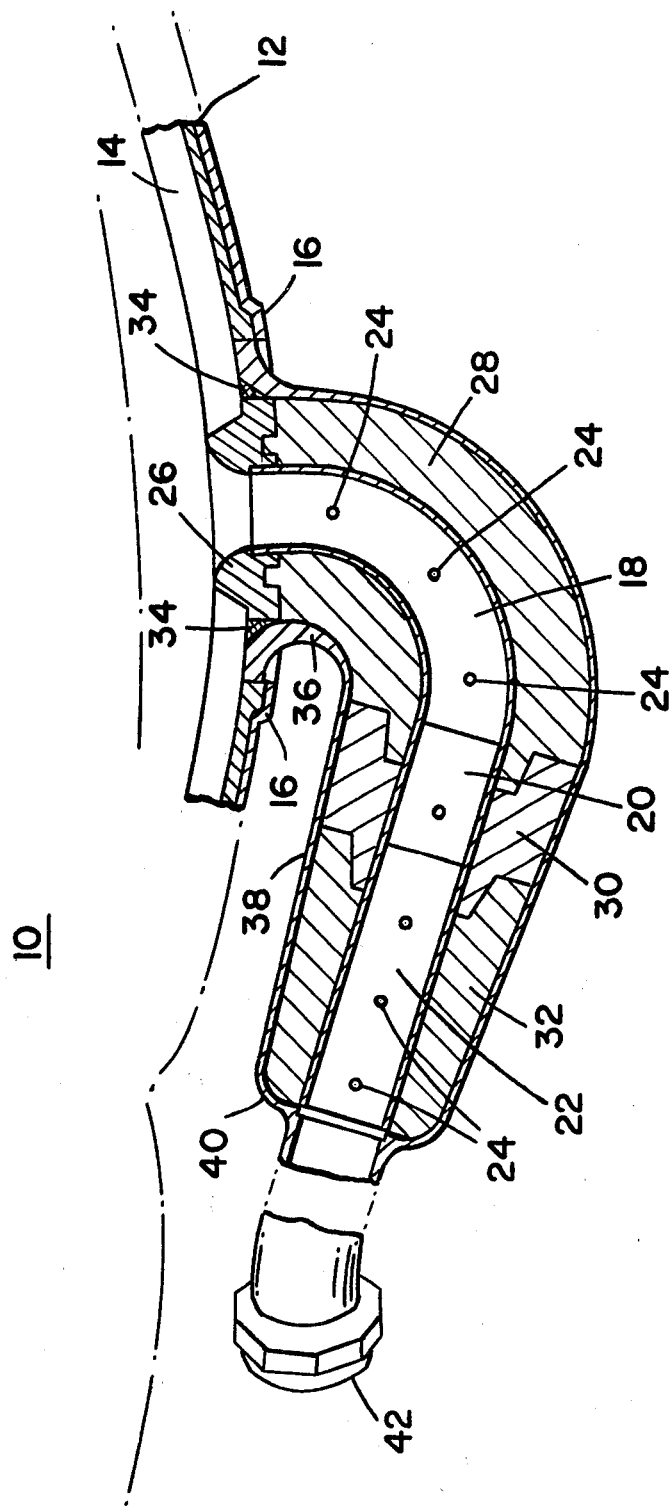
FIG. 1 is a longitudinal sectional view of the instant invention.

Referring to FIG. 1, a longitudinal sectional view of the gas generator outlet 10 is shown. The outlet connects the titanium gas generator case 12, partially shown, having an internal case insulation 14 of rubber and an external case insulation 16 of cork, to a metal manifold, not shown. The interior of the outlet 10 consists of one curved molybdenum liner 18 and two titanium-zirconium-molybdenum (TZM) liners 20, 22, to conduct the gas and to provide a barrier against silica deposit washing. At regular spaced intervals, holes 24 may be drilled in the liners 18, 20, 22 to accomodate outgassing of the encasing four-piece silica phenolic insulation layer 26, 28, 30, 32. The silica phenolic components 26, 28, 30, 32 are formed from silica phenolic billets molded under high temperature and pressure and machined to insulation component configurations. The phenolic and metal liner components are bonded in place end-to-end using a silicone rubber potting. The free volume between the phenolic and the outlet interior surface is also vacuum potted with silicone rubber 34 to eliminate gas paths. The exterior surface of the outlet 10 consists of three metal alloys of increasing temperature capability. The titanium elbow portion 36 is made by a centrifugal investment casting process and welded to the gas generator case 12. A reducer segment is formed from a spun-drawn columbium cone 38 welded to a tantalum-10-tungsten tube and cup machined forging 40. After a hydroproof test the reducer is coated with a high-temperature oxidation resistant silicide material such as LPA-51. A threaded TZM coupling flange 42 is swaged onto the reducer tube and after weld preparation machining, the outlet is completed by weldment of the reducer cone 38 and the titanium elbow 36.

Referring to FIG. 2, a graph of external temperature versus time during operation for one embodiment of the instant invention is shown. The invention is not limited to the dimensions of the embodiment but serves to show the necessary temperature gradient achieved by the instant invention.

What is claimed is:

1. A combustion generator outlet for conducting high temperature gas from a gas generator to a manifold while maintaining a precise temperature gradient along both the radial and longitudinal axes of said outlet comprising:

(a) an external layer constructed of three separate metal alloys of increasing thermal capability as said outlet is traversed from said gas generator to said manifold, said external layer constructed as a titanium elbow portion welded at one end to said gas generator to receive said gas and welded at the opposite end to one end of a reducer portion having increased thermal capability with respect to said elbow portion, said reducer portion having the opposite end welded to a tube end cup assembly having increased thermal capability with respect to said reducer;

(b) an insulation layer of silica phenolic, said insulation layer formed as a cylindrical tube of interlocking segments machined to fit receivably together end-to-end, the thickness of said insulation layer having decreasing taper between said gas generator and said manifold;

(c) an inner tubular liner of titanium-zirconium-molybdenum alloy encased by said insulation layer, said inner layer having an elbow shaped portion open at one end to receive said gas from said generator, a central portion threaded on the opposite end of said elbow portion and an end portion having one end threaded to said central portion and the opposite end welded to said tube and cup assembly of said external layer, said inner liner having a series of small regularly spaced holes along its length; and (d) a titanium-zirconium-molybdenum alloy coupling flange swaged onto one end portion of said outlet for connecting said outlet to said manifold.

2. A gas generator outlet as recited in claim 1 wherein said reducer portion of said external layer is a spun-drawn columbium cone and said tube and cup assembly is formed from a tantalum-tungsten alloy.

* * * * *